(12) United States Patent
Esaki et al.

(10) Patent No.: US 8,651,822 B2
(45) Date of Patent: Feb. 18, 2014

(54) WIND TURBINE ROTOR BLADE AND WIND-GENERATING WIND TURBINE

(75) Inventors: Kouji Esaki, Tokyo (JP); Shinichi Hori, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/070,998

(22) Filed: Mar. 24, 2011

(65) Prior Publication Data

US 2011/0171035 A1 Jul. 14, 2011

Related U.S. Application Data

(63) Continuation of application No. PCT/JP2010/073370, filed on Dec. 24, 2010.

(30) Foreign Application Priority Data

Dec. 25, 2009 (JP) .................................. 2009-296152

(51) Int. Cl.
*F03D 1/00* (2006.01)

(52) U.S. Cl.
USPC ......... 416/226; 416/229 R; 416/233; 416/500

(58) Field of Classification Search
USPC ...................... 416/226, 229 R, 230, 233, 500
See application file for complete search history.

(56) References Cited

U.S. PATENT DOCUMENTS

| | | | |
|---|---|---|---|
| 4,976,587 A * | 12/1990 | Johnston et al. | 416/230 |
| 7,503,752 B2 * | 3/2009 | Gunneskov et al. | 416/229 R |
| 8,043,067 B2 * | 10/2011 | Kuroiwa et al. | 416/230 |
| 8,142,164 B2 * | 3/2012 | Rao et al. | 416/226 |
| 8,172,542 B2 * | 5/2012 | Hirano et al. | 416/230 |
| 8,480,371 B2 * | 7/2013 | Esaki et al. | 416/229 R |
| 2009/0140527 A1 * | 6/2009 | Pawar et al. | 290/55 |
| 2009/0169392 A1 * | 7/2009 | Kuroiwa et al. | 416/241 A |
| 2009/0324412 A1 * | 12/2009 | Roorda | 416/204 R |
| 2010/0008789 A1 | 1/2010 | Jensen | |
| 2010/0135817 A1 * | 6/2010 | Wirt et al. | 416/226 |
| 2010/0135818 A1 * | 6/2010 | Babu et al. | 416/226 |
| 2011/0031758 A1 * | 2/2011 | Mitsuoka et al. | 290/55 |
| 2011/0031759 A1 * | 2/2011 | Mitsuoka et al. | 290/55 |
| 2011/0171035 A1 * | 7/2011 | Esaki et al. | 416/226 |
| 2011/0171036 A1 * | 7/2011 | Esaki et al. | 416/227 A |
| 2012/0141282 A1 * | 6/2012 | Esaki et al. | 416/224 |

FOREIGN PATENT DOCUMENTS

| | | | |
|---|---|---|---|
| JP | 2002-137307 | | 5/2002 |
| JP | 2002357176 A | * | 12/2002 |
| JP | 2007-255366 | | 10/2007 |
| JP | 2011032987 A | * | 2/2011 |
| JP | 2011032988 A | * | 2/2011 |
| WO | WO 2007051465 A1 | * | 5/2007 |

OTHER PUBLICATIONS

Japan Patent Office, "Japanese Decision to Grant a Patent for JP 2009-296152," Nov. 5, 2013.

* cited by examiner

*Primary Examiner* — Edward Look
*Assistant Examiner* — Christopher R Legendre
(74) *Attorney, Agent, or Firm* — Manabu Kanesaka; Kenneth M. Berner; Benjamin J. Hauptman

(57) ABSTRACT

A wind turbine rotor blade including outer skin materials made of fiber-reinforced plastic, a crossbeam material, and a trailing edge sandwich material disposed closer to a trailing edge than a trailing edge end of the crossbeam material, wherein a reinforcing material is provided on an inner surface of the outer skin material on a front side located closer to the trailing edge than a trailing edge end of the trailing edge sandwich material.

5 Claims, 3 Drawing Sheets

US 8,651,822 B2

WIND TURBINE ROTOR BLADE AND WIND-GENERATING WIND TURBINE

CROSS REFERENCE TO RELATED APPLICATIONS

This application is a continuation application of PCT/JP2010/073370 filed on Dec. 24, 2010 and claims the benefit of Japanese Application No. 2009-296152 filed in Japan on Dec. 25, 2009, the contents of which is hereby incorporated by its reference.

BACKGROUND OF THE INVENTION

1. Field of the Invention

The present invention relates to a wind turbine rotor blade constituting a wind-generating wind turbine, and to the wind-generating wind turbine.

2. Description of Related Art

As a wind turbine rotor blade one disclosed in WO2008/086805A2 is known for example.

In recent years, there is proposed a wind turbine rotor blade 100 having a super cap structure which satisfies both light-weight requirement and strength requirement as shown in FIG. 5. The wind turbine rotor blade 100 includes a later-described outer skin material 11, leading edge sandwich materials 12, super cap materials (main strength materials) 13, trailing edge sandwich materials 14 and sheer webs (crossbeam materials) 15. The leading edge sandwich materials 12 and the trailing edge sandwich materials 14 have a sandwich structure in which the outer skin material 11 and the inner skin material 17 form a skin material, and a resin foam body such as PVC and wood material such as balsa form a core material.

In FIG. 5, a symbol 16 represents an adhesive 16 which connects (couples) the super cap materials 13 and the sheer webs 15 to each other.

If a safety factor of a buckling strength and safety factors of material strengths (tensile strength and strength against compression) of members constituting the wind turbine rotor blade 100 (specifically the outer skin material 11, the leading edge sandwich material 12, the super cap material 13, the trailing edge sandwich material 14 and the sheer web 15) can substantially be set equal to each other (e.g., 2), it is possible to further reduce the weight of the wind turbine rotor blade.

According to the wind turbine rotor blade 100 shown in FIG. 5, however, there is an adverse possibility that the super cap material 13 is buckled by a load in a flap direction (longitudinal direction: vertical direction in FIG. 5) before the wind turbine rotor blade 100 exerts 100% material strength, the trailing edge sandwich material 14 and/or a back side and/or front side of the outer skin material 11 located closer to a trailing edge 18 than a trailing edge of the trailing edge sandwich material 14 are buckled by a load in an edge direction (directions of a leading edge and a trailing edge: direction perpendicular to the flap direction).

To increase a buckling strength of the super cap material 13 against a load in the flap direction, a cross-sectional area of the super cap material 13 is maintained constant, a width of the super cap material 13 (length of a chord direction (lateral direction in FIG. 5)) is reduced, a thickness of the super cap material 13 is increased, and an interval between the sheer webs 15 (distance between the sheer web 15 located on the side of the leading edge and the sheer web 15 located on the side of the trailing edge) is reduced.

However, there is a problem that a width of the trailing edge sandwich material 14 (length in the chord direction (lateral direction in FIG. 5)) is increased, and the buckling strength of the trailing edge sandwich material 14 against a load in an edge direction is further deteriorated.

BRIEF SUMMARY OF THE INVENTION

The present invention has been accomplished in view of the above circumstances, and it is an object of the invention to provide a wind turbine rotor blade and a wind-generating wind turbine capable of enhancing a buckling strength against a load in an edge direction, capable of bringing a safety factor of the buckling strength close to a safety factor of a material strength, and capable of further reducing a weight of each of the wind turbine rotor blades and the wind-generating wind turbine.

To solve the above problem, the present invention employed the following means.

A wind turbine rotor blade according to a first aspect of the invention including outer skin materials made of fiber-reinforced plastic, a sheer web, and a trailing edge sandwich material disposed closer to a trailing edge than a trailing edge end of the crossbeam material, wherein a reinforcing material is provided on an inner surface of the outer skin material on a front side located closer to the trailing edge than a trailing edge end of the trailing edge sandwich material.

According to the wind turbine rotor blade of the first aspect of the invention, a thickness of the front side outer skin material located closer to the trailing edge than the trailing edge end of the trailing edge sandwich material is increased by the reinforcing material disposed on the inner surface of the front side outer skin material. Therefore, it is possible to enhance bending rigidity of the trailing edge in the edge direction, a buckling strength of the trailing edge against a load in the edge direction can be enhanced. A safety factor of the buckling strength can be brought close to a safety factor of the material strength, and it is possible to further reduce the weight.

According to the wind turbine rotor blade of the first aspect of the invention, the reinforcing material is mounted on the inner surface of the front side outer skin material located closer to the trailing edge than the trailing edge end of the trailing edge sandwich material. Therefore, it is possible to thin the reinforcing material as compared with a case where the reinforcing material is mounted on an inner surface of the back side outer skin material, and it is easy to avoid interference between an upper surface of the reinforcing material and the inner surface of the outer skin material.

According to the conventional wind turbine rotor blade, the lowest order buckling mode with respect to a load in the edge direction is a trailing edge sandwich material or an outer skin material located closer to the trailing edge than the trailing edge end of the trailing edge sandwich material. When the reinforcing material is mounted on the inner surface of the outer skin material located closer to the trailing edge than the trailing edge end of the trailing edge sandwich material, there is a possibility that Euler buckling of the reinforcing material becomes the lowest order buckling mode. In order to make Euler buckling strength of the reinforcing material greater than the buckling strength of the trailing edge sandwich material or of the outer skin material located closer to the trailing edge than the trailing edge sandwich material while maintaining the cross-sectional area of the reinforcing material, it is only necessary to reduce the width of the reinforcing material and to increase the thickness thereof. However, if the thickness of the reinforcing material is excessively increased, the outer skin material and the inner surface interfere with each other and therefore, it is preferable that the thickness is reduced as thin as possible. When the wind turbine rotor blade has an outer surface shape like the wind turbine blade (the back side is closer to a flat surface as compared with the front side near the trailing edge), if a case where the reinforcing material having the same cross section shape is disposed only on the back side and a case where the reinforcing material is disposed only on the front side are compared with each other, the buckling strength is lowered when the reinforcing material is disposed on the back side as compared with the case where the reinforcing material is disposed on the front side due to influence of curvature. Therefore, if the reinforcing material is disposed on the front side, it is possible to thin the reinforcing material as compared with a case where the reinforcing material is disposed on the back side, and it is easy to avoid the interference between the upper surface of the reinforcing material and the inner surface of the outer skin material.

In the above wind turbine rotor blade, it is preferable that the reinforcing material includes a lightweight core material, an upper surface side skin material disposed on an upper surface side of the lightweight core material, and a lower surface side skin material disposed on a lower surface side of the lightweight core material, and the upper surface side skin material and/or the lower surface side skin material is made of fiber-reinforced plastic in which reinforced fiber is oriented in a longitudinal direction of the blade.

According to the wind turbine rotor blade, the reinforced fibers constituting the upper surface side skin material and/or the lower surface side skin material is arranged along the longitudinal direction of the blade. Therefore, it is possible to further enhance the bending rigidity of the trailing edge in the edge direction, and to enhance the buckling strength of the trailing edge against the load in the edge direction. It is possible to bring the safety factor of the buckling strength close to the safety factor of the material strength, and further reduce the weight.

The wind-generating wind turbine of a second aspect of the invention includes wind turbine rotor blades capable of enhancing the bending rigidity in the trailing edge in the edge direction, and capable of enhancing the buckling strength in the trailing edge against a load in the edge direction, capable of bringing a safety factor of the buckling strength close to a safety factor of the material strength, and capable of further reducing the weight.

According to the wind-generating wind turbine of the second aspect of the invention, it is possible to reduce, in weight, the rotation bearing which connects the rotor head and the root portion of the wind turbine rotor blade to each other, and the connecting shaft which is disposed in the rotor head and which gives rotating motion to the wind turbine blade. A load applied to the tower which supports the wind turbine rotor blades and the rotor head can be reduced.

According to the wind turbine rotor blade of the invention, it is possible to enhance a buckling strength against a load in an edge direction, bring a safety factor of the buckling strength close to a safety factor of a material strength, and further reduce a weight of the wind turbine rotor blade.

DETAILED DESCRIPTION OF THE INVENTION

A first embodiment of wind turbine rotor blades according to the present invention will be described with reference to FIGS. 1 to 3.

Figure 1:
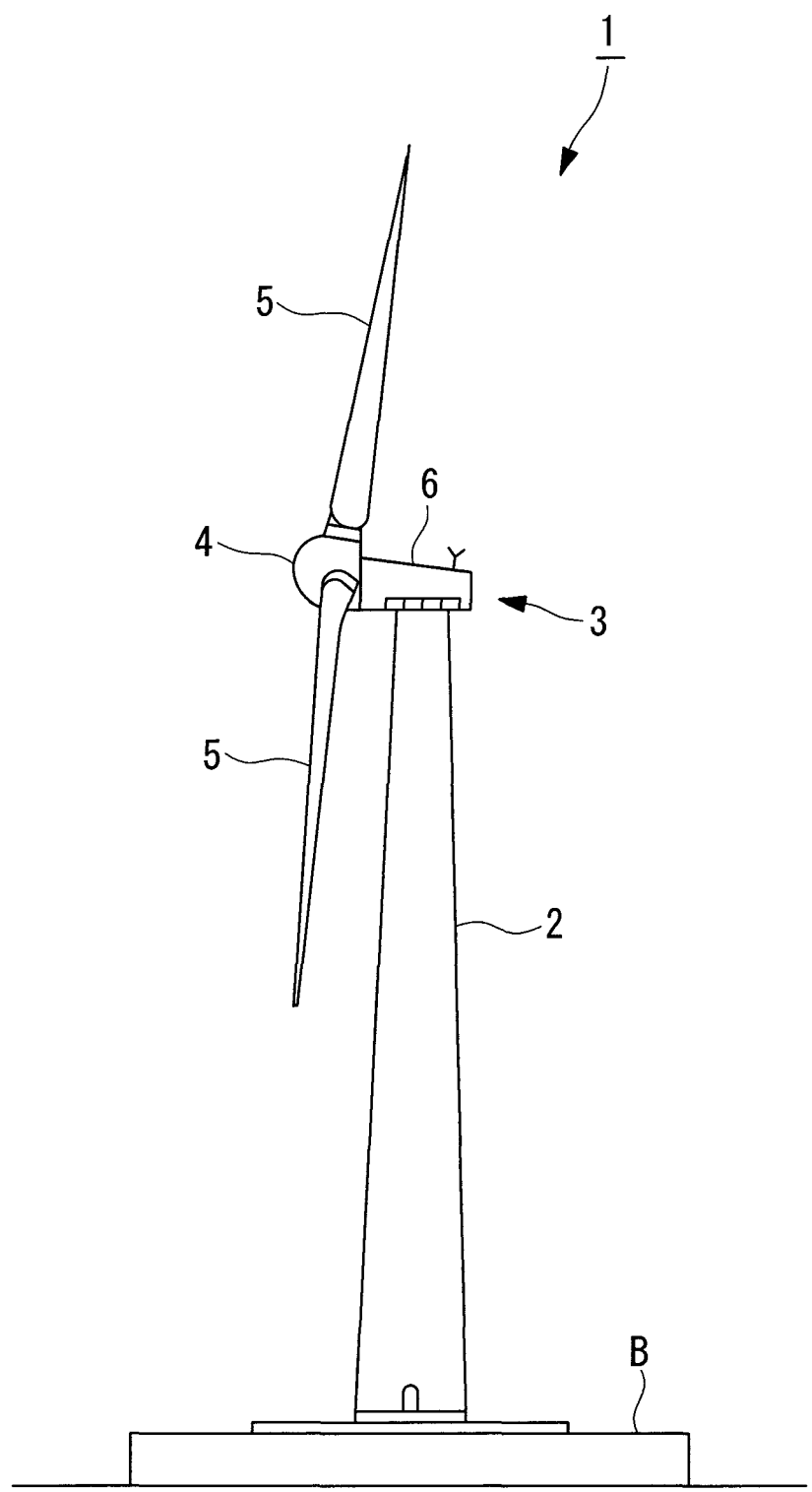
FIG. 1 is a side view showing a wind-generating wind turbine having wind turbine rotor blades according to a first embodiment of the present invention.

FIG. 1 is a side view showing a wind-generating wind turbine having the wind turbine rotor blades according to the first embodiment of the present invention. FIG. 2 is a sectional view of the wind turbine rotor blade of the embodiment. FIG. 3 is an enlarged sectional view of an essential portion in FIG. 2.

As shown in FIG. 1, the wind-generating wind turbine 1 includes a column (also called "tower") 2 standing on a foundation B, a nacelle 3 disposed on an upper end of the column 2, and a rotor head 4 provided on a nacelle 3 such that the rotor head 4 can rotate around a substantially horizontal axis.

A plurality of (e.g., three) wind turbine rotor blades 5 are radially mounted on the rotor head 4 around its rotation axis. According to this, a force of wind which impinges on the wind turbine rotor blades 5 from a direction of the rotation axis of the rotor head 4 is converted into power which rotates the rotor head 4 around its rotation axis.

The column 2 is formed by connecting a plurality of (e.g., three) units (not shown) in the vertical direction.

The nacelle 3 is disposed on the uppermost one of the units which constitute the column 2. The nacelle 3 includes a nacelle bed plate (not shown) mounted on the upper end of the column 2, and a cover 6 covering the nacelle bed plate from above.

Figure 2:
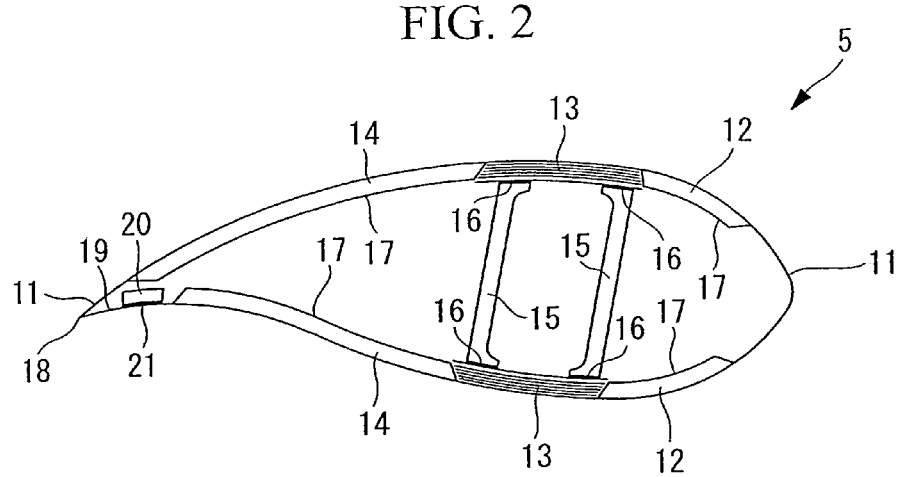
FIG. 2 is a sectional view of the wind turbine rotor blade of the first embodiment of the invention.

As shown in FIG. 2, each of the wind turbine rotor blades 5 is formed as a super cap structure which satisfies both lightweight requirement and strength requirement. The wind turbine rotor blade 5 includes outer skin materials 11, leading edge sandwich materials 12, super cap materials (main strength material) 13, trailing edge sandwich materials 14 and sheer webs (crossbeam materials) 15.

The outer skin material 11, the super cap material 13 and an inner skin material 17 are made (formed) of fiber-reinforced plastic (FRP). The super cap material 13 is formed by laminating many fiber-reinforced plastic layers on one another. The super cap materials 13 are provided on a back side and a front side, one super cap material 13 per side, of the wind turbine rotor blade 5 such that the super cap materials 13 are in contact with end surfaces of back sides (upper sides in FIG. 2) of the sheer webs 15. and in contact with end surfaces of front sides (lower sides in FIG. 2) of the sheer webs 15. The super cap materials 13 and the sheer webs 15 are connected (coupled) to each other through an adhesive 16 which is cured at room temperature.

The leading edge sandwich material 12 and the trailing edge sandwich material 14 have a sandwich structure in which the outer skin material 11 and the inner skin material 17 form a skin material, and a resin foam body such as PVC and wood material such as balsa form a core material. The leading edge sandwich material 12 and the trailing edge sandwich material 14 are sandwiched between the outer skin material 11 and the inner skin material 17.

According to the super cap structure, the bending strength of the wind turbine rotor blade 5 in a flap direction is maintained mainly by the super cap material 13 made of fiber-reinforced plastic. The leading edge sandwich material 12 and the trailing edge sandwich material 14 are used as auxiliary materials for maintaining the buckling strength of the wind turbine rotor blade 5.

In the wind turbine rotor blade 5 of the embodiment, a reinforcing material 20 is provided (disposed) on an inner surface 19 of the front side outer skin material 11 in trailing edge portion 23 located closer to a trailing edge 18 than a trailing edge end of the trailing edge sandwich material 14.

Figure 3:
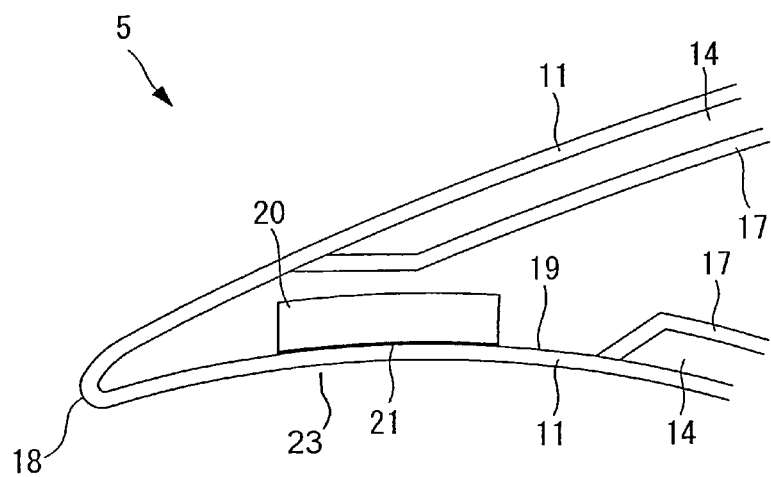
FIG. 3 is an enlarged sectional view of an essential portion in FIG. 2.

As shown in FIGS. 2 and 3, the reinforcing material 20 is formed by laminating, on one another, many (e.g., twenty) fiber-reinforced plastic layers in which reinforced fibers (not shown) are oriented in a longitudinal direction of the wind turbine rotor blade 5 (direction perpendicular to sheet surfaces in FIGS. 2 and 3), and a thickness of the reinforcing material 20 is about 20 mm. The reinforcing material 20 is connected (coupled) to the inner surface 19 of the front side outer skin material 11 through an adhesive 21 which is cured at room temperature.

According to the wind turbine rotor blade 5 of the embodiment, a thickness of the front side outer skin material 11 located closer to the trailing edge 18 than the trailing edge end of the trailing edge sandwich material 14 is increased by the reinforcing material 20 disposed on the inner surface 19. Therefore, the bending rigidity of the trailing edge in the edge direction can be enhanced, and the buckling strength of the trailing edge against a load in the edge direction can be enhanced. A safety factor of the buckling strength can be brought close to a safety factor of the material strength, and it is possible to further reduce the weight.

As a result, even if a width of the trailing edge sandwich material 14 (length in a chord direction (lateral direction in FIG. 2)) is increased, the buckling strength of the trailing edge sandwich material 14 against the load in the edge direction can be prevented from being lowered. Therefore, an interval between the sheer webs 15 in the chord direction, i.e., a distance between the sheer web 15 located on the side of the leading edge and the sheer web 15 located on the side of the trailing edge can be reduced. Therefore, it is possible to reduce the width of the super cap material 13 (at that time, the super cap material 13 is thickened while maintaining the cross-sectional area of the super cap material 13 at the same value), and the buckling strength of the super cap material 13 against the load in the flap direction can be enhanced.

According to the wind turbine rotor blade 5 of the embodiment, the reinforcing material 20 is mounted only on the inner surface 19 of the front side outer skin material 11 located closer to the trailing edge 18 than the trailing edge end of the trailing edge sandwich material 14. Therefore, as compared with a case where the reinforcing material is mounted only on the inner surface of the back side outer skin material, it is possible to thin the reinforcing material, and it is easy to avoid interference between an upper surface of the reinforcing material and an inner surface of the outer skin material.

According to the conventional wind turbine rotor blade, the lowest order buckling mode with respect to a load in the edge direction is a trailing edge sandwich material or a outer skin material located closer to the trailing edge than the trailing edge end of the trailing edge sandwich material. When the reinforcing material is mounted on the inner surface of the outer skin material located closer to the trailing edge than the trailing edge end of the trailing edge sandwich material, there is a possibility that Euler buckling of the reinforcing material becomes the lowest order buckling mode. In order to make Euler buckling strength of the reinforcing material greater than the buckling strength of the trailing edge sandwich material or of the outer skin material located closer to the trailing edge than the trailing edge sandwich material while maintaining the cross-sectional area of the reinforcing material, it is only necessary to reduce the width of the reinforcing material and to increase the thickness thereof. However, if the thickness of the reinforcing material is excessively increased, the outer skin material and the inner surface interfere with each other, and therefore, it is preferable that the thickness is reduced as thin as possible. When the wind turbine rotor blade has an outer surface shape like the wind turbine blade (the back side is closer to a flat surface as compared with the front side near the trailing edge), if a case where the reinforcing material having the same cross section shape is disposed only on the back side and a case where the reinforcing material is disposed only on the front side are compared with each other, the buckling strength is lowered when the reinforcing material is disposed on the back side as compared with the case where the reinforcing material is disposed on the front side due to influence of curvature. Therefore, if the reinforcing material is disposed on the front side, it is possible to thin the reinforcing material as compared with a case where the reinforcing material is disposed on the back side, and it is easy to avoid the interference between the upper surface of the reinforcing material and the inner surface of the outer skin material.

According to the wind turbine rotor blade 5 of the embodiment, since the reinforced fibers constituting the reinforcing material 20 are arranged along the longitudinal direction of the blade, it is possible to further enhance the bending rigidity of the trailing edge in the edge direction, and to enhance the buckling strength of the trailing edge against the load in the edge direction. It is possible to bring the safety factor of the buckling strength close to the safety factor of the material strength, and the weight can further be reduced.

According to the wind-generating wind turbine 1 having the wind turbine rotor blades 5 of the embodiment, it is possible to reduce, in weight, the rotation bearing which connects the rotor head and the root portion of the wind turbine rotor blade to each other, and the connecting shaft which is disposed in the rotor head and which gives rotating motion to the wind turbine blade. A load applied to the tower 2 which supports the wind turbine rotor blades 5 and the rotor head 4 can be reduced.

A second embodiment of the wind turbine rotor blade of the present invention will be described with reference to FIG. 4.

Figure 4:
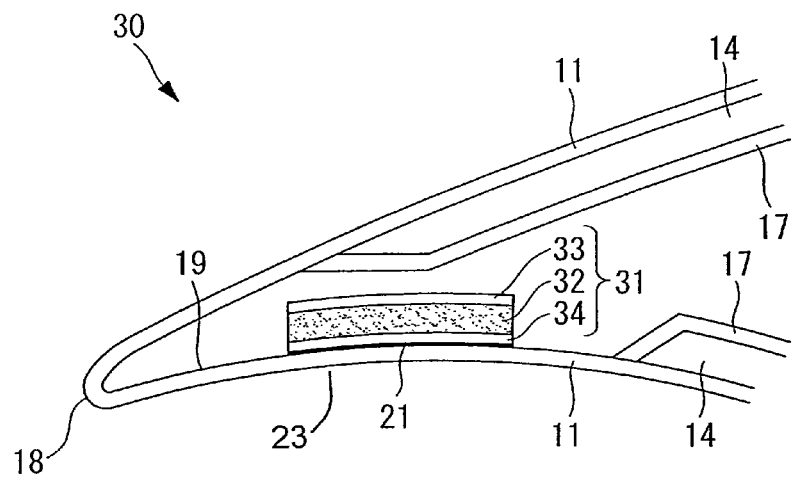
FIG. 4 is similar to FIG. 3, and is an enlarged sectional view of an essential portion of a wind turbine rotor blade according to a second embodiment.

FIG. 4 is similar to FIG. 3, and is an enlarged sectional view of an essential portion of the wind turbine rotor blade according to the second embodiment.

The wind turbine rotor blade 30 of the second embodiment is different from that of the first embodiment in that the wind turbine rotor blade 30 includes a reinforcing material 31 instead of the reinforcing material 20. Since other constituent elements are the same as those of the first embodiment, description of these constituent elements will be omitted.

The same members as those of the first embodiment are designated with the same symbols.

As shown in FIG. 4, the reinforcing material 31 of this embodiment includes a lightweight core material 32, a (upper surface side) skin material 33 disposed on an upper surface side of the lightweight core material 32, and a (lower surface side) skin material 34 disposed on a lower surface side of the lightweight core material 32.

The lightweight core material 32 is made (formed) of resin foam body such as PVC or wood material such as balsa, and is sandwiched between the skin material 33 and the skin material 34.

The skin materials 33 and 34 have the same lengths as a length of corresponding (opposing) end surfaces of the lightweight core material 32 in the chord direction (lateral direction in FIG. 4). The skin materials 33 and 34 are made (formed) of fiber-reinforced plastic in which reinforced fibers (not shown) are oriented in the longitudinal direction of the wind turbine rotor blade 30 (direction perpendicular to a sheet surface of FIG. 4).

The skin material 33 is adhered to an end surface on the upper surface side of the lightweight core material 32, the skin material 34 is adhered to an end surface on the lower surface side of the lightweight core material 32, and the lightweight core material 32 and the skin materials 33 and 34 are integrally formed (configured) together. The inner surface 19 of the front side outer skin material 11 and the skin material 34 are connected (coupled) to each other through an adhesive 21 which is cured at room temperature.

According to the wind turbine rotor blade 30 of this embodiment, the reinforcing material 31 is of sandwich structure in which the lightweight core material 32 is sandwiched between the skin material 33 and the skin material 34. Therefore, it is possible to reduce the reinforcing material 31 and the entire wind turbine rotor blade 30 in weight, and the bending rigidity of the trailing edge in the edge direction can be enhanced. The buckling strength of the trailing edge against a load in the edge direction can be enhanced, the safety factor of the buckling strength can be brought close to the safety factor of the material strength, and it is possible to further reduce the weight.

Since other effect is the same as that of the first embodiment, description thereof is omitted here.

The present invention is not limited to the above-described embodiments, and the invention can variously be changed and modified within a range not departing from a subject matter of the invention.

Figure 5:
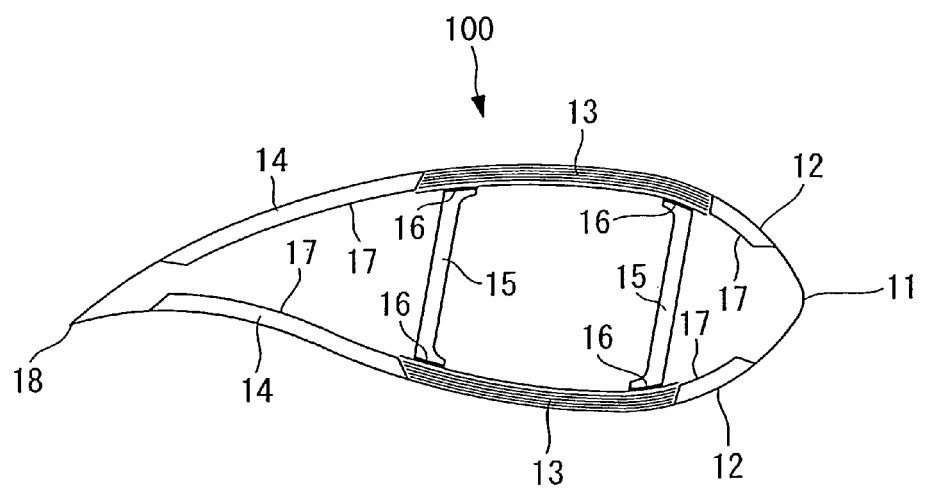
FIG. 5 is similar to FIG. 2, and is a sectional view showing a conventional wind turbine rotor blade.

For example, the reinforcing materials 20 and 31 can be applied not only to the wind turbine rotor blade having the structure shown in FIG. 5, but also be applied to a wind turbine rotor blade having sheer webs of box structure.

What is claimed is:

1. A wind-generating wind turbine, comprising:
a wind turbine rotor blade comprising
outer skin materials made of fiber-reinforced plastic,
a crossbeam material,
a trailing edge lightweight core material disposed closer to a trailing edge than a trailing edge end of the crossbeam material, and
a trailing edge portion,
wherein a reinforcing material is provided on an inner surface of the outer skin material on a front side of the trailing edge portion located closer to the trailing edge than the trailing edge end of the trailing edge lightweight core material,
the reinforcing material is independently provided from the trailing edge lightweight core material,
the reinforcing material includes a lightweight core material, an upper surface side skin material disposed on an upper surface side of the lightweight core material, and a lower surface side skin material disposed on a lower surface side of the lightweight core material, and
the upper surface side skin material and/or the lower surface side skin material is made of fiber-reinforced plastic in which reinforced fiber is oriented in a longitudinal direction of the blade.

2. A wind turbine rotor blade, comprising:
outer skin materials made of fiber-reinforced plastic,
a crossbeam material,
a trailing edge lightweight core material disposed closer to a trailing edge than a trailing edge end of the crossbeam material, and
a trailing edge portion,
wherein a reinforcing material is provided on an inner surface of the outer skin material on a front side of the trailing edge portion located closer to the trailing edge than the trailing edge end of the trailing edge lightweight core material,
the reinforcing material is independently provided from the trailing edge lightweight core material,
the reinforcing material includes a lightweight core material, an upper surface side skin material disposed on an upper surface side of the lightweight core material, and a lower surface side skin material disposed on a lower surface side of the lightweight core material, and
the upper surface side skin material and/or the lower surface side skin material is made of fiber-reinforced plastic in which reinforced fiber is oriented in a longitudinal direction of the blade.

3. The wind turbine rotor blade according to claim 2, wherein the lightweight core material is made of resin foam.

4. The wind turbine rotor blade according to claim 2, wherein the lightweight core material is made of wood.

5. The wind turbine rotor blade according to claim 2, wherein the lower surface side skin material contacts with the inner surface of the outer skin material.

* * * * *